US012611719B2

(12) United States Patent
Ueda et al.

(10) Patent No.: US 12,611,719 B2
(45) Date of Patent: Apr. 28, 2026

(54) DIAMOND CUTTING TOOL

(71) Applicant: SUMITOMO ELECTRIC HARDMETAL CORP., Hyogo (JP)

(72) Inventors: Akihiko Ueda, Hyogo (JP); Mayuka Segawa, Hyogo (JP); Rintaro Sugimoto, Hyogo (JP); Machiko Abe, Hyogo (JP); Takashi Harada, Hyogo (JP); Satoru Kukino, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 651 days.

(21) Appl. No.: 17/642,196

(22) PCT Filed: Aug. 18, 2020

(86) PCT No.: PCT/JP2020/031123
§ 371 (c)(1),
(2) Date: Mar. 10, 2022

(87) PCT Pub. No.: WO2021/054019
PCT Pub. Date: Mar. 25, 2021

(65) Prior Publication Data
US 2022/0297201 A1      Sep. 22, 2022

(30) Foreign Application Priority Data
Sep. 18, 2019    (JP) ................................. 2019-169740

(51) Int. Cl.
*B23B 27/20*          (2006.01)
*B23B 51/00*          (2006.01)
(52) U.S. Cl.
CPC .............. *B23B 27/20* (2013.01); *B23B 51/00* (2013.01); *B23B 2222/92* (2013.01); *B23B 2226/31* (2013.01); *B23B 2226/315* (2013.01)

(58) Field of Classification Search
CPC . B23B 2222/92; B23B 2226/31; B23B 27/00; B23B 51/00; B23B 2226/315; B23B 27/14; Y10T 408/907
(Continued)

(56) References Cited

U.S. PATENT DOCUMENTS 7,314,540 B2    1/2008  Seki et al.
9,180,520 B2    11/2015  Davel
(Continued)

FOREIGN PATENT DOCUMENTS

CA          2102159 A  *  5/1994  ............. B23B 27/00
CN        101745654 A      6/2010
(Continued)

OTHER PUBLICATIONS

Hinneberg H.-J. et al., "Hot-filament-grown diamond films on Si: characterization of impurities", May, 1, 1992, Diamond and Related Materials, Elsevier Science Publishers B.V., Amsterdam, pp. 810-813.

*Primary Examiner* — Sunil K Singh
*Assistant Examiner* — Michael Vitale
(74) *Attorney, Agent, or Firm* — Renner, Otto, Boisselle & Sklar, LLP

(57) ABSTRACT
A diamond cutting tool comprises a base metal part and a diamond part joined to the base metal part, wherein the base metal part is made of an alloy containing tungsten carbide, the diamond part configures at least a cutting blade, the cutting blade comprises a portion of a rake face, a portion of a flank face, and a ridge line at which the rake face and the flank face cross, the diamond cutting tool has a region A, the region A is a region that is present bridging over the three, which are the rake face, the ridge line, and the flank face on the surface of the cutting blade, and the region A has a surface roughness Ra of not more than 0.2 μm and a
(Continued)

concentration of tungsten element of not more than 1 mass %.

7 Claims, 1 Drawing Sheet

(58) Field of Classification Search
USPC ........................................................ 408/226
See application file for complete search history.

(56) References Cited

U.S. PATENT DOCUMENTS

| | | | | |
|---|---|---|---|---|
| 2007/0172321 A1* | 7/2007 | Nagai | .................. | B23C 5/1009 |
| | | | | 407/53 |
| 2009/0060670 A1* | 3/2009 | Sugano | ............. | B23Q 11/0046 |
| | | | | 408/230 |
| 2010/0003091 A1 | 1/2010 | Muraki | | |
| 2012/0258035 A1 | 10/2012 | Sumiya et al. | | |
| 2013/0264124 A1* | 10/2013 | Belnap | ................. | E21B 10/567 |
| | | | | 175/428 |
| 2015/0125226 A1 | 5/2015 | Yano | | |
| 2015/0218694 A1* | 8/2015 | Xu | .......................... | C23C 28/04 |
| | | | | 428/206 |
| 2015/0298292 A1* | 10/2015 | Can | .......................... | C23F 1/02 |
| | | | | 51/296 |
| 2017/0233889 A1* | 8/2017 | Nishibayashi | .......... | C30B 33/06 |
| | | | | 428/155 |
| 2017/0341159 A1 | 11/2017 | Ogawa | | |
| 2019/0270142 A1* | 9/2019 | Bookheimer | .......... | B23B 51/02 |
| 2019/0344355 A1 | 11/2019 | Kobayashi et al. | | |
| 2020/0261985 A1* | 8/2020 | Kubo | ................... | C23C 16/271 |
| 2023/0115988 A1* | 4/2023 | Harada | ................... | B23C 5/10 |
| | | | | 407/30 |

FOREIGN PATENT DOCUMENTS

| | | | | | | |
|---|---|---|---|---|---|---|
| CN | 105665806 A | * | 6/2016 | ............. | B23P 15/34 |
| CN | 104440004 B | | 8/2016 | | |
| CN | 107952986 A | * | 4/2018 | ............ | B23B 27/00 |
| CN | 108422021 A | | 8/2018 | | |
| CN | 109789496 A | | 5/2019 | | |
| CN | 110094163 A | | 8/2019 | | |
| JP | 2-232106 A | | 9/1990 | | |
| JP | H05-009814 U | | 2/1993 | | |
| JP | 2004223648 A | | 8/2004 | | |
| JP | 2008-272863 A | | 11/2008 | | |
| JP | 2010-36295 A | | 2/2010 | | |
| JP | 2012-161873 A | | 8/2012 | | |
| JP | 2013-220525 A | | 10/2013 | | |
| JP | 2014-000663 A | | 1/2014 | | |
| JP | 2018122365 A | * | 8/2018 | | |
| JP | 6481416 B2 | | 3/2019 | | |
| WO | 2009/044488 A1 | | 4/2009 | | |
| WO | 2012/023473 A1 | | 2/2012 | | |
| WO | 2012/023473 A9 | | 2/2012 | | |

* cited by examiner

DIAMOND CUTTING TOOL

TECHNICAL FIELD

The present invention relates to a diamond cutting tool. The present invention claims priority based on Patent Application No. 2019-169740, which is a Japanese patent application filed on Sep. 18, 2019. All of the contents described in this Japanese patent application are deemed to be incorporated by reference into the present description.

BACKGROUND ART

Single crystal diamond (hereinafter, also referred to as "SCD") and binderless polycrystalline diamond (hereinafter, also referred to as "BLPCD") have extremely high degrees of hardness and are thus used as tool materials for various cutting tools (hereinafter, also referred to as "diamond cutting tools"). Diamond cutting tools are commonly formed by joining SCD or BLPCD to a base metal to be a base body by a means such as brazing. The term "BLPCD" herein means polycrystalline diamond produced by sintering diamond particles converted from graphite without using a binder.

When polishing work using a grindstone is carried out as a work method for forming a cutting blade on SCD or BLPCD in the diamond cutting tool, the work on the cutting blade requires a long time, and defects often tend to be caused at a ridge line at which a rake face and a flank face configuring the cutting blade cross. Further, the SCD and BLPCD are insulators, which make electrical discharge machining unusable as the work method to be carried out. For this reason, laser work is widely used as the work method for the diamond cutting tools. For example, Japanese Patent Laying-Open No. 2014-000663 (PTL 1) discloses a diamond cutting tool in which laser work is carried out on at least a flank face of a cutting blade.

CITATION LIST

Patent Literature

PTL 1: Japanese Patent Laying-Open No. 2014-000663

SUMMARY OF INVENTION

The diamond cutting tool according to the present disclosure is a diamond cutting tool comprising a base metal part and a diamond part joined to the base metal part, wherein the base metal part is made of an alloy containing tungsten carbide, the diamond part configures at least a cutting blade, the cutting blade includes a portion of a rake face, a portion of a flank face, and a ridge line at which the rake face and the flank face cross, the diamond cutting tool has a region A, the region A is a region that is present bridging over the three, which are the rake face, the ridge line, and the flank face on the surface of the cutting blade, and the region A has a surface roughness Ra of not more than 0.2 μm and a concentration of tungsten element of not more than 1 mass %.

DETAILED DESCRIPTION

Figure 1:
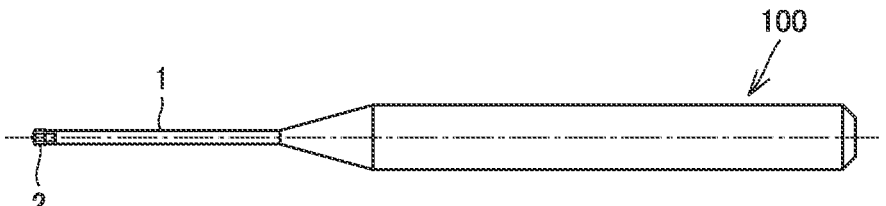
FIG. 1 is a reference drawing showing an example of the side of the diamond cutting tool according to the present embodiment.

Problem to be Solved by the Present Disclosure

When a cutting blade is formed on a diamond cutting tool of a fine size by laser work, SCD or BLPCD is joined to a base metal and then these are worked integrally to be the diamond cutting tool. Further, in diamond cutting tools, an alloy containing tungsten carbide is widely used as a material for the base metal. For this reason, when SCD or BLPCD and a base metal in a diamond cutting tool are integrally worked by laser work, tungsten tends to adhere to the surface of SCD or BLPCD by laser abrasion and the like. As a cutting blade is formed on this SCD or BLPCD, the diamond cutting tool has a probability of working on a work material to be cut using the cutting blade to which tungsten is adhered, whereby in such an instance the work material to be cut is likely to be contaminated by tungsten. Thus, it has been desired to develop diamond cutting tools capable of preventing a work material to be cut from being contaminated by tungsten due to a lowered concentration of tungsten element at the surface of the cutting blade made of SCD or BLPCD even when a diamond cutting tool is formed by laser work.

In consideration of the above aspects, the present disclosure aims to provide a diamond cutting tool capable of preventing a work material to be cut from being contaminated by tungsten.

Advantageous Effect of the Present Disclosure

According to the present disclosure, a diamond cutting tool capable of preventing a work material to be cut from being contaminated by tungsten is provided.

DESCRIPTION OF EMBODIMENTS

The present inventors conducted extensive studies to solve the above problems and accomplished the present disclosure. Specifically, attention was paid to the physical or chemical removal of tungsten element, which adhered to the surface of a cutting blade of a diamond part caused by the work method using laser work, from the surface of the cutting blade without adversely affecting the surface roughness Ra of the cutting blade. By this, the present inventors found that the diamond cutting tool having a surface roughness Ra of a cutting blade suitable for the use for a high-quality surface work, a low concentration of tungsten element at the surface of the cutting blade, and capable of preventing a work material to be cut from being contaminated by tungsten can be obtained, whereby the present disclosure came to accomplishment.

Embodiments of the present disclosure are first described by listing.

[1] The diamond cutting tool according to an embodiment of the present disclosure comprises a base metal part and a diamond part joined to the base metal part, wherein the base metal part is made of an alloy containing tungsten carbide, the diamond part configures at least a cutting blade, the cutting blade includes a portion of a rake face, a portion of a flank face, and a ridge line at which the rake face and the flank face cross, the diamond cutting tool has a region A, the region A is a region that is present bridging over the three, which are the rake face, the ridge line, and the flank face on the surface of the cutting blade, and the region A has a surface roughness Ra of not more than 0.2 μm and a concentration of tungsten element of not more than 1 mass %. The diamond cutting tool with these features has a low concentration of tungsten element at the surface of the cutting blade, thereby enabling the prevention of a work material to be cut by the diamond cutting tool from being contaminated by tungsten.

[2] The diamond part preferably has a specific resistance of more than $1×10^8$ Ω·cm. By this, a work material to be cut by a diamond cutting tool including an insulating diamond part can be prevented from being contaminated by tungsten.

[3] The concentration of tungsten element in the region A is preferably not more than 0.5 mass %. By this, a diamond cutting tool capable of preventing a material to be cut from being contaminated by tungsten can be provided in a good yield.

The concentration of tungsten element in the region A is preferably not more than 0.1 mass %. By this, a diamond cutting tool capable of preventing a material to be cut from being contaminated by tungsten can be provided in a better yield.

[5] The surface roughness Ra in the region A is preferably not more than 0.1 μm. By this, a diamond cutting tool equipped with a cutting blade having an excellent surface roughness Ra can be provided and thus suitable for the use for a high-quality surface work.

[6] The diamond part preferably has a size that fits inside a cylindrical shape defined by a diameter of 3 mm×a length of 20 mm. By this, a work material to be cut by a diamond cutting tool of a fine size can be prevented from being contaminated by tungsten.

[7] The diamond part is preferably made of a single crystal diamond or a binderless polycrystalline diamond. By this, a work material to be cut by a diamond cutting tool including the diamond part made of a single crystal diamond or a binderless polycrystalline diamond can be prevented from being contaminated by tungsten.

Details of Embodiments

Hereinafter, embodiments of the present disclosure (hereinafter, also referred to as the "present embodiment") will be described in further detail. In the drawings used in the descriptions of the present embodiments, the same reference signs refer to the same or corresponding parts. Further, in the drawings, each of the constituent elements is shown by suitably being adjusted to a reduced scale for easier understanding, and a reduced scale of each constituent element shown in the drawings is not necessarily identical with reduced scales of the actual constituent elements.

In the present description, the writing style "A to B" means the upper limit and the lower limit of a range (that is, not less than A and not more than B), and when there is no unit described at A and a unit is described only at B, the unit for A and the unit for B are the same. Further, in the case of showing a compound by a chemical formula in the present description, conventionally known various atomic ratios are included unless an atomic ratio is particularly specified and should not necessarily be limited only to those within stoichiometric ranges.

[Diamond Cutting Tool]

Figure 2:
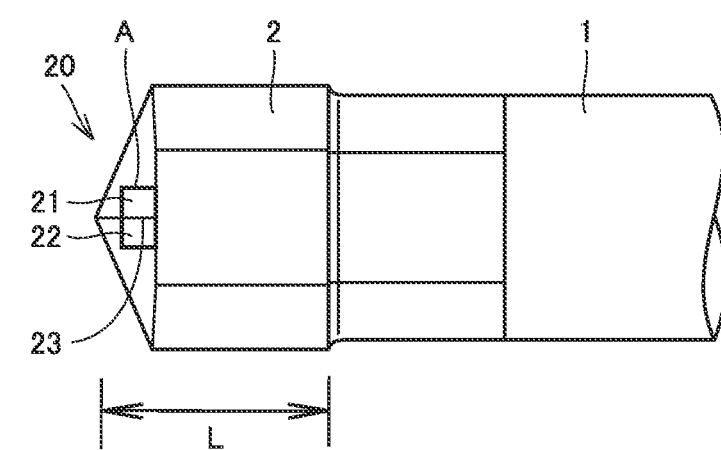
FIG. 2 is a reference drawing showing the side of the diamond part included in the diamond cutting tool shown in FIG. 1.
Figure 3:
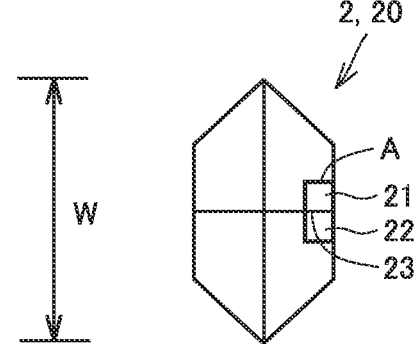
FIG. 3 is a reference drawing showing the front of the cutting blade in the diamond part included in the diamond cutting tool shown in FIG. 1.

With reference to FIGS. 1 to 3, the diamond cutting tool according to the present embodiment will be described. FIG. 1 shows an example of the side of the diamond cutting tool according to the present embodiment. Further, FIG. 2 shows the side of the diamond part included in the diamond cutting tool shown in FIG. 1. FIG. 3 shows the front of the cutting blade in the diamond part included in the diamond cutting tool shown in FIG. 1.

The diamond cutting tool according to the present embodiment is, as shown in FIG. 1, a diamond cutting tool 100 comprising a base metal part 1 and a diamond part 2 joined to base metal part 1. In FIG. 1, diamond cutting tool 100 is specifically a fine drill and formed by, for example, joining diamond part 2 made of SCD or BLPCD to be described later to a shank part as base metal part 1 in the fine drill by a means such as brazing. Base metal part 1 is made of an alloy containing tungsten carbide.

Diamond part 2 configures, as shown in FIGS. 2 and 3, at least a cutting blade 20, cutting blade 20 includes a portion of a rake face 21, a portion of a flank face 22, and a ridge line 23 at which rake face 21 and flank face 22 cross.

Further, diamond cutting tool 100 has a region A. Region A is a region that is present bridging over the three, rake face 21, ridge line 23, and flank face 22 on the surface of cutting blade 20. Region A has a surface roughness Ra of not more than 0.2 μm, and a concentration of tungsten element is not more than 1 mass %. Diamond cutting tool 100 having these features can prevent a material to be cut as a work object from being contaminated by tungsten.

<<Base Metal Part>>

Base metal part 1 is made of an alloy containing tungsten carbide (WC) as described above. Base metal part 1 can use any of the conventionally known alloys as this kind of base metal part as long as it includes tungsten carbide (WC). Examples of the alloy for base metal part 1 include cemented carbides (including, for example, those including Co or to which a carbonitride such as Ti, Ta, and Nb is added in addition to WC-based cemented carbide and WC) and high-speed steel (those including at least W).

Of these alloys to be base metal part 1, cemented carbides (particularly WC-based cemented carbides) are preferably selected. Cemented carbides have excellent balance between hardness and strength at a high temperature and have excellent properties as base metal part 1 of a diamond cutting tool for the above use. When a WC-based cemented carbide is used as base metal part 1, an alloy structure thereof can include free carbon, irregular layer called the η-phase or E-phase and the like. Further, base metal part 1 also accepts those whose surface is modified. For example, in the case of cemented carbides, a β-free layer can be formed on the surface thereof.

The content (mass %) of WC in base metal part 1 is preferably not less than 70 mass % and less than 100 mass %, more preferably not less than 75 mass % and not more than 95 mass %, and further preferably not less than 80 mass % and not more than 90 mass %.

The content (mass %) of WC in a base metal part can be measured by the following method. First, a cross section of the base metal part is cut out using a wire-electrical discharge machine to the base metal part in a diamond cutting tool. Then, the cross section is mirror-polished using a diamond slurry having an average particle size of 3 μm to use as an observation sample. Further, a measurement field of view of 100 μm×100 μm is randomly set to the polished surface of the observation sample, and energy dispersive x-ray spectroscopic analysis (product name: "X-Max", manufactured by Oxford Instruments plc) is carried out to the measurement field of view, whereby a content of WC particles can be measured.

The present inventors confirmed here that even when contents of WC particles are measured several times by changing selection sites of measurement field of view to the polished surface of the observation sample, there is no substantial measurement result variability as long as the identical sample is measured, and thus a random set of the measurement field of view is permissible.

<<Diamond Part>>

Diamond part 2 is preferably made of a single crystal diamond (SCD) or a binderless polycrystalline diamond (BLPCD). This SCD and BLPCD will be described later. Further, diamond part 2 preferably has a size that fits inside a cylindrical shape defined by a diameter of 3 mm×a length of 20 mm. Diamond part 2 more preferably has a size that fits inside a cylindrical shape defined by a diameter of 2 mm×a length of 15 mm, and further preferably has a size that fits inside a cylindrical shape defined by a diameter of 0.75 mm×a length of 10 mm. The size of diamond part 2 can be determined by using a non-contact 3D measurement system (product name: "INFINITE FOCUS G5", manufactured by Alicona).

Generally, when a diamond part of a diamond cutting tool has a size described above, possible breakages and the like in the process of forming a cutting blade at the diamond part are considered, whereby laser work is employed as the work method for the diamond cutting tool and a base metal part and the diamond part have to be integrally worked. For this reason, in the present embodiment, it is preferable to obtain diamond cutting tool 100 by using, for example, the production method for a diamond cutting tool to be described later to lower a concentration of tungsten element at the surface of cutting blade 20 even when diamond cutting tool 100 is formed by laser work.

Further, diamond part 2 preferably has a specific resistance of more than $1 \times 10^8$ Ω·cm. Specifically, diamond part 2 is preferably made of, as described above, SCD or BLPCD. SCD herein can be produced by using conventionally known high-temperature and high-pressure (HTHP) method, chemical vapor deposition (CVID) and the like. BLPCD can be produced by sintering graphite, a starting material, by a conventionally known high-temperature and high-pressure method to convert to diamond particles and simultaneously the diamond particles are bound with each other.

SCD or BLPCD composing diamond part 2 can include conventionally known impurities such as nitrogen and boron.

Diamond part 2 having a specific resistance of more than $1 \times 10^8$ Ω·cm, specifically diamond part 2 made of SCD or BLPCD, shows insulation property. In this case also, electrical discharge machining cannot be applied to the work method for forming diamond cutting tool 100, and thus laser work is widely used. For this reason, in the present embodiment, it is preferable to obtain diamond cutting tool 100 by using, for example, the production method for a diamond cutting tool to be described later to lower a concentration of tungsten element at the surface of cutting blade 20 even when diamond cutting tool 100 is formed by laser work.

The specific resistance of diamond part 2 can be measured using an ohmmeter (product name: "4339B High-resistance meter", manufactured by Agilent Technologies, Inc.). Further, SCD and BLPCD composing diamond part 2 can be prepared respectively by using a conventionally known production method for obtaining them. The upper limit of the specific resistance in diamond part 2 is not particularly limited and, for example, $1 \times 10^{14}$ Ω·cm.

<Cutting Blade>

As shown in FIGS. 2 and 3, diamond part 2 configures at least cutting blade 20. Cutting blade 20 includes a portion of rake face 21 and a portion of flank face 22, and ridge line 23 at which rake face 21 and flank face 22 cross. Specifically, cutting blade 20, as described above, includes a portion of rake face 21, a portion of flank face 22, and ridge line 23 and refers to the part directly involved with the cutting of a work material to be cut. In cutting blade 20 shown in FIGS. 2 and 3, the surface opposed to a work surface of a work material to be cut at the time of cutting makes flank face 22, and the continuous surface to flank face 22 via ridge line 23 makes rake face 21. The term "rake face" means the surface for removing chips produced by shearing from a work material to be cut, and the term "flank face" means the surface, a portion of which is in contact with the work material to be cut.

<Region A>

Diamond cutting tool 100 has a region A. Region A is a region that is present bridging over the three, which are rake face 21, ridge line 23, and flank face 22, on the surface of the cutting blade 20. Region A has an area of, for example, 2500 to 40000 μm² at the surface of cutting blade 20 formed on diamond part 2 of diamond cutting tool 100. It is preferable that region A be any places to be described later at which the surface roughness Ra and the concentration of tungsten element can be measured at the surface of cutting blade 20 and set in such a way as to bridge over the three, which are rake face 21, ridge line 23, and flank face 22 at the surface of cutting blade 20.

For example, in diamond cutting tool 100 shown in FIG. 1, region A can be the region surrounded by the square in FIGS. 2 and 3. That is, region A, in FIGS. 2 and 3, can be, when a virtual line having a length of 100 μm on ridge line 23 is an axis of symmetry, a region sandwiched between a virtual line on rake face 21 and a virtual line on flank face 22 passing respectively through the points, which are 100 μm away in a perpendicular direction to the above axis of symmetry, to the rake face 21 side and the flank face 22 side from this axis of symmetry. Region A shown in FIGS. 2 and 3 is present bridging over rake face 21, ridge line 23, and flank face 22 and has an area of 20000 μm².

More specifically, in the case of measuring a surface roughness Ra, region A is preferably set as a region having an area of 2500 to 40000 μm² bridging over the three, rake face 21, ridge line 23, and flank face 22 in a microscope image taken using a laser microscope (product name: "OLS5000-SAT", manufactured by Olympus Corporation). Further, in the case of measuring tungsten element, region A is preferably set as a region having an area of 2500 to 40000 μm² bridging over the three, rake face 21, ridge line 23, and flank face 22 in a microscope image taken using a scanning electron microscope (product name: "JSM-7900F", manufactured by JEOL Ltd.) equipped with an energy dispersive x-ray spectroscopic analysis system (product name: "JED-2300 Analysis Station Plus", manufactured by JEOL Ltd.).

(Surface Roughness Ra)

Region A has a surface roughness Ra of not more than 0.2 μm. Diamond cutting tool 100, when region A has a surface roughness Ra of not more than 0.2 μm, has cutting blade 20 with the surface of excellent surface roughness Ra thereby making it suitable for the use for a high-quality surface work of a work material to be cut. The surface roughness Ra in region A is preferably not more than 0.1 μm. The smaller the surface roughness Ra of region A, the better, but the lower limit value thereof can be, for example, 0.01 μm. Here in the present description, the term "high-quality surface work" refers to the work on a work material to be cut using the diamond cutting tool 100 in such a way as to have properties such as a mirror surface having at least a surface roughness Ra of not more than 0.2 μm, more preferably not more than 0.1 μm, and further preferably not more than 0.05 μm.

The surface roughness Ra in region A can be determined in conformity with JIS B 0601 (2001). Specifically, the surface roughness Ra in region A can be determined by carrying out the following method using the laser microscope as the non-contact surface roughness tester to the measurement places set in the rake face and the flank face present within region A.

First, a diamond cutting tool is produced based on, for example, the production method for a diamond cutting tool to be described later to prepare a diamond cutting tool to be measured. Further, region A is set at the surface of a cutting blade of the diamond cutting tool using the laser microscope by the method described above.

Next, in each of the rake face and the flank face within region A, 5 measurement places for the surface roughness Ra are randomly set. Lastly, the surface roughness Ra at these places is measured by the laser microscope, and average values of these measured values can be determined respectively as the surface roughness Ra on the rake face side and the surface roughness Ra on the flank face side within region A. In the present description, the phrase "surface roughness Ra in region A is not more than 0.2 μm" means that a surface roughness Ra on the rake face side and a surface roughness Ra on the flank face side within region A are both not more than 0.2 μm. In the case of clearly specifying that the "surface roughness Ra in region A is not more than 0.1 μm", it means that a surface roughness Ra on the rake face side and a surface roughness Ra on the flank face side are both not more than 0.1 μm.

The present inventors confirmed here that even when surface roughness Ra is measured several times by suitably changing measurement places for the surface roughness Ra, there is no substantial measurement result variability as long as the identical diamond cutting tool to be measured is measured, and thus a random set of the measurement places is permissible.

(Concentration of Tungsten Element)

Region A has a concentration of tungsten element of not more than 1 mass %. Diamond cutting tool 100, when a concentration of tungsten element in region A is not more than 1 mass %, can prevent a work material to be cut by diamond cutting tool 100 from being contaminated by tungsten due to a lowered concentration of tungsten element at the surface of cutting blade 20. The concentration of tungsten element in region A is preferably not more than 0.5 mass %. The concentration of tungsten element in region A is more preferably not more than 0.1 mass %. The minimum value of tungsten element concentration in region A is 0 mass % as an ideal value.

The concentration of tungsten element in region A can be determined by carrying out the following method using a scanning electron microscope equipped with the energy dispersive x-ray spectroscopic analysis system (hereinafter also referred to as "SEM-EDS") on the measurement places set at the rake face and the flank face present within region A.

First, a diamond cutting tool is produced based on, for example, the production method for a diamond cutting tool to be described later to prepare a diamond cutting tool to be measured. Further, region A is set at the surface of a cutting blade of the diamond cutting tool using the SEM-EDS by the method described above. Next, in each of the rake face and the flank face within region A, 5 measurement places for the concentration of tungsten element are set. Lastly, the concentration of tungsten element at these places is measured by the SEM-EDS, and average values of these measured values can be determined respectively as the concentration of tungsten element on the rake face side and the concentration of tungsten element on the flank face side within region A. In the present description, the phrase "concentration of tungsten element in region A is not more than 1 mass %" means that a concentration of tungsten element on the rake face side and a concentration of tungsten element on the flank face side within region A are both not more than 1 mass %. In the present description, in the case of clearly specifying that the "concentration of tungsten element in region A is not more than 0.5 mass %" and the "concentration of tungsten element in region A is not more than 0.1 mass %" respectively, they mean that a concentration of tungsten element on the rake face side and a concentration of tungsten element on the flank face side are both concentrations of not more than the concentrations clearly specified.

The present inventors confirmed here that even when a concentration of tungsten element is measured several times by suitably changing measurement places for the concentration of tungsten element, there is no substantial measurement result variability as long as the identical diamond cutting tool to be measured is measured, and thus a random set of the measurement places is permissible.

[Production Method for a Diamond Cutting Tool]

The production method for a diamond cutting tool according to the present embodiment should not be particularly limited as long as a diamond cutting tool having a surface roughness Ra of not more than 0.2 μm and a concentration of tungsten element of not more than 1 mass % in region A set at the surface of the cutting blade as described above can be obtained. However, from a viewpoint of the production yield and the like, it is preferable to obtain a diamond cutting tool by, for example, the production method described below. The present inventors paid attention to the physical or chemical removal of tungsten element, which adhered to the surface of a cutting blade, without adversely affecting the surface roughness Ra of the cutting blade. By this, the present inventors found that the diamond cutting tool having a surface roughness Ra of a cutting blade suitable for the use for a high-quality surface work, a low concentration of tungsten element at the surface of the cutting blade, and capable of preventing a material to be cut from being contaminated by tungsten can be obtained in a good yield.

That is, the production method for a diamond cutting tool according to the present embodiment preferably comprises a step of preparing a base body to be the base metal part and a diamond material to be the diamond part in a diamond cutting tool (preparation step), a step of obtaining a workpiece by joining the diamond material to the base body (joining step), a step of obtaining a diamond cutting tool precursor by carrying out laser work to the workpiece (laser work step), and a step of removing tungsten element from the surface of cutting blade in the diamond cutting tool precursor (tungsten removal step). Hereinafter, each step of the above production method for a diamond cutting tool will be described.

<Preparation Step>

The present step is a step of preparing a base body to be the base metal part and a diamond material to be the diamond part in a diamond cutting tool. The base body to be the base metal part can be prepared using a conventionally known material as long as a material including an alloy containing tungsten carbide is used. The material for the base body is preferably a cemented carbide including tungsten carbide. Further, the base body, when a diamond cutting tool is a fine drill, is preferably prepared, for example, as a round bar shape having a diameter of 3 to 6 mm and a length of 40 to 70 mm by a conventionally known work method. For an example of the base body, a round bar made of a cemented carbide which uses IGETALLOY® (kind of material: AFU) manufactured by Sumitomo Electric Industries, Ltd. can be preferably used.

The diamond material to be the diamond part can also be prepared by using a conventionally known production method for obtaining this. For example, the diamond material, when is SCD, can be prepared by using a conventionally known high-temperature and high-pressure (HTHP) method, chemical vapor deposition (CVD) method and the like. BLPCD, when it is the diamond material, can be prepared by sintering graphite as a starting material by a conventionally known high-temperature and high-pressure method to convert to diamond particles and simultaneously the diamond particles are bound with each other. The SCD and BLPCD are preferably prepared, for example, as a round bar shape having a diameter of 0.3 to 3 mm and a length of 0.5 to 5 mm by a conventionally known work method.

<Joining Step>

The present step is a step of obtaining a workpiece by joining a diamond material to a base body. First, a stepped work or a work for forming a taper is carried out to the round bar-shaped base body mentioned above by suitably using a conventionally known turning work, thereby to form a shank part with a cylindrical small diameter part having a diameter of 0.25 to 3 mm and a length of 0.3 to 20 mm at one end. Then, the end face (circular face) of the SCD or BLPCD worked into a cylindrical shape is joined by brazing to the apical face of the small diameter part side of this shank part. For the brazing, a conventionally known method can be used and, for example, the brazing using silver braze is preferable. By this, a workpiece can be obtained.

<Laser Work Step>

The present step is a step of obtaining a diamond cutting tool precursor by carrying out laser work to the workpiece. Specifically, the shank part side of the workpiece is mounted on a conventionally known laser work machine. Further, the side of the small diameter part at the shank part of the workpiece and the side of SCD or BLPCD joined to the shank part are worked by scanning using the laser of the laser work machine, thereby to form a cutting blade in a diamond cutting tool. By this, a diamond cutting tool precursor can be obtained.

The laser irradiance conditions of the laser work machine can be conventionally known conditions. The laser wavelength of, for example, 532 nm or 1064 nm can be used. The laser spot diameter can be 10 to 50 μm, the laser output can be 2 to 10 W, and the laser scanning speed can be 10 to 30 mm/min and the like.

<Tungsten Removal Step>

The present step is a step of removing tungsten element from the surface of the cutting blade in the diamond cutting tool precursor. Tungsten carbide in the base body (shank part) adheres to the surface of the cutting blade made of SCD or BLPCD by the abrasion and the like by the laser used in the laser work step, and thus the object of the present step is to remove the tungsten carbide from the surface of the cutting blade in the present step. Specifically, in the present step, it is preferable to carry out at least either physical removal of tungsten element from the surface of the cutting blade by polishing the surface of the cutting blade or chemical removal of tungsten element from the surface of the cutting blade by washing the surface of the cutting blade using a chemical. Further, in the present step, it is more preferable to carry out both of the physical removal method and the chemical removal method to the diamond cutting tool precursor to remove tungsten element from the surface of the cutting blade. By this, tungsten element can be removed from the surface of the cutting blade in the diamond cutting tool precursor, and thus a diamond cutting tool can be obtained.

Examples of the method for physically removing tungsten element from the surface of the cutting blade include a method for polishing the surface of the cutting blade for 1 to 10 minutes by elastic polishing media including diamond abrasive grains using a mirror finishing device (product name: "AERO LAP (registered trademark)", manufactured by Yamashita Works co., Ltd. Examples of the method for chemically removing tungsten element from the surface of the cutting blade include a method in which Murakami's reagent (a reagent obtained by dissolving 10 g of KOH and 10 g of potassium ferricyanide ($K_3Fe(CN)_6$) in 100 mL of purified water) is used, and the surface of the cutting blade is washed by being immersed in the Murakami's reagent for 15 to 60 minutes.

Effect

The diamond cutting tool obtained by the above production method has a surface roughness Ra of not more than 0.2 μm and a concentration of tungsten element of not more than 1 mass % in the region A at the surface of the cutting blade as described above. Thus, by the above production method, the diamond cutting tool having a surface roughness Ra of a cutting blade suitable for the use for a high-quality surface work, a low concentration of tungsten element at the surface of the cutting blade, and capable of preventing a material to be cut from being contaminated by tungsten can be obtained.

(Addendum)

The above descriptions include the embodiments added below.

<Addendum 1>

A diamond cutting tool comprising a base metal part and a diamond part joined to the base metal part, wherein the base metal part is made of an alloy containing tungsten carbide, the diamond part configures at least a cutting blade, the cutting blade includes a portion of a rake face, a portion of a flank face, and a ridge line at which the rake face and the flank face cross, the diamond cutting tool has a region A, the region A is a region that is present bridging over the three, which are the rake face, the ridge line, and the flank face on the surface of the cutting blade, and the region A has a surface roughness Ra of not more than 0.2 μm and a concentration of tungsten element of not more than 1 mass %.

<Addendum 2>

The diamond cutting tool according to Addendum 1, wherein the region A has an area of 2500 to 40000 μm$^2$ at the surface of the cutting blade.

11

<Addendum 3>

The diamond cutting tool according to Addendum 1 or 2, wherein the diamond part has a specific resistance of not more than $1\times10^{14}$ $\Omega\cdot$cm.

<Addendum 4>

The diamond cutting tool according to any one of Addendums 1 to 3, wherein a surface roughness Ra in the region A is not less than 0.01 μm.

<Addendum 5>

The diamond cutting tool according to any one of Addendums 1 to 4, wherein a surface roughness Ra in the region A is not more than 2 μm at both of the rake face side and the flank face side, and preferably not more than 0.1 μm at the both sides.

<Addendum 6>

The diamond cutting tool according to any one of Addendums 1 to 5, wherein a concentration of tungsten element in the region A is not more than 1 mass % at both of the rake face side and the flank face side, preferably not more than 0.5 mass % at the both sides, and further preferably not more than 0.1 mass % at the both sides.

EXAMPLES

Hereinafter, the present disclosure will be described in detail with reference to examples, but the present disclosure is not limited to these. In each of the examples and comparative examples to be described later, fine drills as shown in FIGS. 1 to 3 were respectively produced as the diamond cutting tools, and region A was set at the surface of the cutting blade of each diamond cutting tool, thereby to determine the surface roughness Ra and the concentration of tungsten element in region A.

Production of a Diamond Cutting Tool

Example 1

(Preparation Step)

As a base body to be the base metal part, a round bar (diameter of 3 mm×length of 40 mm) made of a cemented carbide which uses IGETALLOY® (kind of material: AFU) manufactured by Sumitomo Electric Industries, Ltd. was prepared. As a diamond material to be the diamond part, a cylindrical shape BLPCD (diameter of 0.7 mm×length of 0.8 mm) produced by a conventionally known high-temperature and high-pressure method was prepared.

(Joining Step)

First, a conventionally known turning work was carried out to form a cylindrical small diameter part having a diameter of 0.57 mm and a length of 11.5 mm at one end of the round bar made of a cemented carbide, thereby to form a shank part from the round bar made of a cemented carbide. The end face of the cylindrical BLPCD was joined by brazing using silver braze to the apical face of this shank part, thereby to obtain a workpiece.

(Laser Work Step)

The side of the small diameter part at the shank part of the workpiece and the side of BLPCD joined to the shank part were worked by scanning using the laser of the laser work machine under the following laser irradiation conditions. By this, a cutting blade was formed in a diamond cutting tool, and thus a diamond cutting tool precursor was obtained.

The laser irradiation conditions of the laser work machine are as follows.

Laser wavelength: 1064 nm
Laser spot diameter: 20 μm
Laser output: 5 W
Laser scanning speed: 10 mm/min.

(Tungsten Removal Step)

The surface of the cutting blade of the diamond cutting tool precursor was immersed in Murakami's reagent having the composition described above and washed for 60 minutes, thereby to remove tungsten element from the surface of the cutting blade. By doing the above, the diamond cutting tool of Example 1 was obtained.

The diamond cutting tool was measured for the size of the diamond part using the non-contact 3D measurement system (product name: "INFINITE FOCUS G5", manufactured by Alicona) and found to have a maximum width W of the diamond part of 0.65 mm when viewed from the front as shown in FIG. 3 and a length L of 0.8 mm when viewed from the side as shown in FIG. 2. By this, the diamond part had the size that fits inside the cylindrical shape defined by a diameter of 3 mm×a length of 20 mm. The term "maximum width W" of the diamond part herein means the distance of the longest line segment of the line segments between 2 points on the outline of the polygon appeared when the diamond part is viewed from the front.

Example 2

The same production method for a diamond cutting tool as Example 1 was carried out, thereby to obtain a diamond cutting tool having a maximum width of 0.65 mm and a length of 0.8 mm, in the exception that, in the tungsten removal step, the surface of the cutting blade was polished for 5 minutes by elastic polishing media including diamond abrasive grains using a mirror finishing device (product name: "AERO LAP (registered trademark)", manufactured by Yamashita Works Co., Ltd.), and washed for 30 minutes by the Murakami's reagent.

Example 3

The same production method for a diamond cutting tool as Example 1 was carried out, thereby to obtain a diamond cutting tool having a maximum width of 0.65 mm and a length of 0.8 mm, in the exception that, in the tungsten removal step, the surface of the cutting blade was polished for 5 minutes by the elastic polishing media using the mirror finishing device, washed for 30 minutes by the Murakami's reagent and further polished for 1 minute by the elastic polishing media using the mirror finishing device.

Example 4

The same production method for a diamond cutting tool as Example 1 was carried out, thereby to obtain a diamond cutting tool having a maximum width of 0.65 mm and a length of 0.8 mm, in the exception that the laser work step was carried out by scanning a laser based on the following laser irradiation conditions.

(Laser Irradiation Conditions)

Laser wavelength: 532 nm
Laser spot diameter: 20 μm
Laser output: 5 W
Laser scanning speed: 10 mm/min.

Example 5

The same production method for a diamond cutting tool as Example 1 was carried out, thereby to obtain a diamond cutting tool having a maximum width of 0.65 mm and a length of 0.8 mm, in the exception that SCD (diameter 0.7 mm×length 0.8 mm) produced by a conventionally known high-temperature and high-pressure method was prepared as a diamond material to be the diamond part in the preparation step, and the laser work step was carried out by scanning a laser based on the following laser irradiation conditions.

(Laser Irradiation Conditions)

Laser wavelength: 532 nm

Laser spot diameter: 20 μm

Laser output: 3 W

Laser scanning speed: 10 mm/min.

Example 6

The same production method for a diamond cutting tool as Example 5 was carried out, thereby to obtain a diamond cutting tool having a maximum width of 0.65 mm and a length of 0.8 mm, in the exception that the tungsten removal step was the same as Example 2.

Example 7

The same production method for a diamond cutting tool as Example 5 was carried out, thereby to obtain a diamond cutting tool having a maximum width of 0.65 mm and a length of 0.8 mm, in the exception that the tungsten removal step was the same as Example 3.

Example 8

The same production method for a diamond cutting tool as Example 5 was carried out, thereby to obtain a diamond cutting tool having a maximum width of 0.65 mm and a length of 0.8 mm, in the exception that the laser work step was carried out by scanning a laser based on the following laser irradiation conditions.

(Laser Irradiation Conditions)

Laser wavelength: 1064 nm

Laser spot diameter: 20 μm

Laser output: 5 W

Laser scanning speed: 10 mm/min.

Comparative Example 1

The same production method for a diamond cutting tool as Example 3 was carried out, thereby to obtain a diamond cutting tool having a maximum width of 0.65 mm and a length of 0.8 mm, in the exception that the laser work step was carried out by scanning a laser based on the following laser irradiation conditions.

(Laser Irradiation Conditions)

Laser wavelength: 1064 nm

Laser spot diameter: 20 μm

Laser output: 5 W

Laser scanning speed: 40 mm/min.

Comparative Example 2

The same production method for a diamond cutting tool as Example 3 was carried out, thereby to obtain a diamond cutting tool having a maximum width of 0.65 mm and a length of 0.8 mm, in the exception that the tungsten removal step was not carried out.

Comparative Example 3

The same production method for a diamond cutting tool as Example 7 was carried out, thereby to obtain a diamond cutting tool having a maximum width of 0.65 mm and a length of 0.8 mm, in the exception that the laser work step was carried out by scanning a laser based on the following laser irradiation conditions.

(Laser Irradiation Conditions)

Laser wavelength: 532 nm

Laser spot diameter: 20 μm

Laser output: 5 W

Laser scanning speed: 40 mm/min.

Comparative Example 4

The same production method for a diamond cutting tool as Example 7 was carried out, thereby to obtain a diamond cutting tool having a maximum width of 0.65 mm and a length of 0.8 mm, in the exception that the tungsten removal step was not carried out.

[Surface Roughness Ra and Concentration of Tungsten Element in Region A]

To the diamond cutting tools of Example 1 to Example 8 and Comparative Example 1 to Comparative Example 4, region A was set at the cutting blade thereof using the method described above. Further, the surface roughness Ra and the concentration of tungsten element at measurement places (5 each place) set at the rake face and the flank face in region A were measured by the method described above, thereby to determined surface roughness Ra and concentrations of tungsten element in region A. Region A in each diamond cutting tool herein is present bridging over the rake face, the ridge line, and the flank face as shown in FIGS. 2 and 3 and has an area of 20000 $\mu m^2$. The results are shown in Table 1.

[Evaluation on Tungsten Contamination on Materials to be Cut]

Using the diamond cutting tools of Example 1 to Example 8 and Comparative Example 1 to Comparative Example 4, high-quality surface work was carried out on one face of a cuboidal material to be cut by the following cutting conditions, thereby to form a drill hole. Further, an evaluation apparatus produced in-house by the applicant in which a parallel-plate plasma generator and a mass spectrometer (product name: "Qulee with YTP-H", manufactured by ULVAC EQUIPMENT SALES, Inc.) were linked was prepared.

<Cutting Conditions>

Material to be cut: alumina

Rotation speed: 15000 rpm

Tool feed rate: 5 mm/rev

Step feed: 0.4 mm

Cutting oil: water-soluble emulsion 5 mass %.

Then, the above-mentioned materials to be cut into which the drill hole was formed (hereinafter also referred to as the "materials to be cut of Example 1 to Example 8 and Comparative Example 1 to Comparative Example 4") were housed in a vacuum chamber so that the drill hole was positioned to be exposed to the plasma in the vacuum chamber of the plasma generator apparatus. Further, an argon gas was introduced to the vacuum chamber, and RF high frequency was applied between the parallel plates, thereby to generate argon plasma and float the elements adhered to the drill hole of the material to be cut.

Finally, the elements present floating in the vacuum chamber were drawn in the mass spectrometer and specified, with a detection limit of 10 ppm, the kinds of the elements using the mass spectrometry, thereby to examine the presence and absence of tungsten element. The results are shown in Table 1. The term "absent" in Table 1 means that tungsten element was not detected (that is, less than 10 ppm), and the drill hole in the material to be cut was not contaminated by tungsten. The term "present" means that tungsten element was detected (that is, not less than 10 ppm), and the drill hole in the material to be cut was contaminated by tungsten.

TABLE 1

| | Kind of diamond part | Ra on rake face side in Region A (μm) | Ra on flank face side in Region A (μm) | W Concentration on rake face side in Region A (mass %) | W Concentration on flank face side in Region A (mass %) | Presence or absence of W contamination on worked surface of material to be cut |
|---|---|---|---|---|---|---|
| Example 1 | BLPCD | 0.09 | 0.09 | 0.8 | 0.8 | Absent |
| Example 2 | BLPCD | 0.08 | 0.08 | 0.4 | 0.4 | Absent |
| Example 3 | BLPCD | 0.09 | 0.09 | 0.02 | 0.02 | Absent |
| Example 4 | BLPCD | 0.18 | 0.18 | 0.95 | 0.95 | Absent |
| Example 5 | SCD | 0.08 | 0.08 | 0.7 | 0.7 | Absent |
| Example 6 | SCD | 0.09 | 0.09 | 0.5 | 0.5 | Absent |
| Example 7 | SCD | 0.07 | 0.07 | 0.03 | 0.03 | Absent |
| Example 8 | SCD | 0.15 | 0.15 | 0.9 | 0.9 | Absent |
| Comparative Example 1 | BLPCD | 0.25 | 0.25 | 0.06 | 0.06 | Absent |
| Comparative Example 2 | BLPCD | 0.07 | 0.07 | 3 | 3 | Present |
| Comparative Example 3 | SCD | 0.31 | 0.31 | 0.2 | 0.2 | Absent |
| Comparative Example 4 | SCD | 0.07 | 0.07 | 3 | 3 | Present |

Discussion

The diamond cutting tools of Example 1 to Example 8 had excellent surface roughness Ra and lower concentrations of tungsten element in region A when compared with the diamond cutting tools of Comparative Example 1 to Comparative Example 4. Further, it was confirmed that the drill holes in the material to be cut worked by the diamond cutting tool of Example 1 to Example 8 were not contaminated by tungsten. Thus, the diamond cutting tools of Example 1 to Example 8 can prevent a material to be cut to be the work object from being contaminated by tungsten. Further, it is understood that the diamond cutting tools of Example 1 to Example 8 maintain excellent surface roughness Ra.

The embodiments and the examples of the present disclosure have been described as above, but suitable combinations of the configuration of each embodiment and example described above, and various modifications are also initially planned.

The embodiments and examples disclosed this time should be understood as examples in all aspects and not limitative. The scope of the present invention is specified by the claims but not by the embodiments or examples described above, and it is intended to include equivalent meanings to the claims and all alterations in the claims.

REFERENCE SIGNS LIST

100 diamond cutting tool; 1 base metal part; 2 diamond part; 20 cutting blade; 21 rake face; 22 flank face; 23 ridge line; A region; L length of diamond part; W maximum width of diamond part

The invention claimed is:

1. A diamond cutting tool comprising a base metal part and a diamond part joined to the base metal part, wherein the base metal part is made of an alloy containing tungsten carbide, the diamond part includes at least a cutting blade, a surface of the cutting blade includes three sections including a portion of a rake face, a portion of a flank face, and a ridge line at which the portion of the rake face and the portion of the flank face cross, the diamond part has a region A, the region A is a region that is present bridging over the three sections, which are the portion of the rake face, the ridge line, and the portion of the flank face on the surface of the cutting blade, and the region A has a surface roughness Ra of not more than 0.2 μm, wherein the diamond part has a size that fits entirely inside a cylindrical shape defined by a diameter of 3 mm×a length of 20 mm, the diamond part is made of a single crystal diamond or a binderless polycrystalline diamond, the region A has a concentration of tungsten element of not less than 0.03 mass % and not more than 0.9 mass % where the diamond part is made of the single crystal diamond, and the region A has a concentration of tungsten element of not less than 0.02 mass % and not more than 0.95 mass % where the diamond part is made of the binderless polycrystalline diamond.

2. The diamond cutting tool according to claim 1, wherein the diamond part has a specific resistance of more than $1\times10^8$ Ω·cm.

3. The diamond cutting tool according to claim 1, wherein the concentration of tungsten element at the region A is not more than 0.5 mass %.

4. The diamond cutting tool according to claim 1, wherein the concentration of tungsten element at the region A is not more than 0.1 mass %.

5. The diamond cutting tool according to claim 1, wherein the surface roughness Ra at the region A is not more than 0.1 μm.

6. The diamond cutting tool according to claim 1, wherein the region A has a surface roughness Ra of not less than 0.011 μm.

7. The diamond cutting tool according to claim 1, wherein the tungsten element is adhered to the surface of the cutting blade.

\* \* \* \* \*